United States Patent [19]

Payne

[11] Patent Number: 4,946,697

[45] Date of Patent: Aug. 7, 1990

[54] PUFFING BIOLOGICAL MATERIAL

[75] Inventor: Frederick A. Payne, Lexington, Ky.

[73] Assignee: University of Kentucky Research Foundation, Lexington, Ky.

[21] Appl. No.: 275,898

[22] Filed: Nov. 25, 1988

[51] Int. Cl.$^5$ .............................................. A23P 1/14
[52] U.S. Cl. .................................. 426/445; 426/447; 425/4 R; 131/296
[58] Field of Search ............... 426/384, 385, 486, 445, 426/444, 447, 448, 470; 131/296; 264/50, 53

[56] References Cited

U.S. PATENT DOCUMENTS

| | | |
|---|---|---|
| 1,725,171 | 8/1929 | Anderson . |
| 2,278,469 | 4/1942 | Musher .............................. 426/447 |
| 2,761,781 | 9/1956 | Bailey . |
| 3,170,803 | 2/1965 | Moyan .............................. 426/470 |
| 3,754,930 | 8/1973 | Toei .................................. 426/447 |
| 3,765,904 | 10/1973 | de Roissart ...................... 426/386 |
| 3,787,586 | 1/1974 | Hokanson ........................ 426/486 |
| 3,882,253 | 5/1975 | Schafer ............................ 426/385 |
| 4,055,675 | 10/1977 | Popper et al. ................... 426/447 |
| 4,235,250 | 3/1978 | Utsch . |
| 4,253,474 | 3/1978 | Hibbitts et al. . |
| 4,561,453 | 12/1981 | Rothchild . |
| 4,565,706 | 1/1986 | Wertheim ........................ 426/470 |

Primary Examiner—Carolyn Paden
Attorney, Agent, or Firm—King & Schickli

[57] ABSTRACT

A method and apparatus for puffing biological material such as fruits and vegetables are provided. The method includes the steps of: (a) placing the material in a pressure chamber; (b) subjecting the material to a puffing gas such as carbon dioxide at an increased pressure between substantially 400 and 1200 psi; (c) quickly releasing the puffing gas pressure in less than 1 second to puff the material; and (d) drying the material after puffing to set it in the puffed state. The material is prepared for puffing by sizing so as to include at least one dimension of between substantially 0.025 and 1.0 inches. The moisture content is also reduced or increased to between substantially 15 and 60% wet basis. Puffing gas usage may be minimized by overpressuring with an inert gas such as nitrogen. The apparatus includes a variable volume pressure chamber that also allows usage of puffing gas to be minimized. More specifically, the volume of the chamber is maintained relatively small during charging with puffing gas. Conversely, when releasing the gas and puffing the material, the volume of the chamber is increased to allow room for the material to expand.

14 Claims, 2 Drawing Sheets

PUFFING BIOLOGICAL MATERIAL

TECHNICAL FIELD

The present invention relates generally to the processing of biological materials and, more particularly, to a method and apparatus for puffing biological materials including dehydrated food products such as fruits and vegetables so as to provide overall improved quality at a reasonable cost.

BACKGROUND OF THE INVENTION

It has always been the goal of the food products industry to provide superior quality food products with a long shelf life. This allows the wholesaler and the retailer to purchase large quantities of food products when prices are low and store them until purchased by consumers. Thus, not only do the wholesalers and retailers benefit but ultimately the consumers do as well by being able to purchase food products at relatively low prices.

With the relative abundance of food and the increasing competition in the marketplace, the quality of the food products is becoming more and more important to promote sales. This is particularly true of vegetables and fruit. Consumers want fruit and vegetable products that maintain the overall appearance, including color and texture, as well as the flavor of fresh fruits and vegetables.

In order to meet this end, the food products industry relied for years almost exclusively on canning processes. Canned fruits and vegetables have a very long shelf life and largely maintain the desired appearance and fresh-like flavor. Canned products do, however, suffer from a number of disadvantages.

In particular, the canning process typically requires a relatively large level of salt in order to maintain the flavor of the fruits and vegetables. Recent growing awareness of the physical complications, including hardening of the arteries, caused by excessive levels of salt in the body has led the consuming public to look toward food products packaged with lower levels of salt. As such, canned products are growing in disfavor.

Another problem with canned products relates to their overall weight. More specifically, in order to maintain as much of the original flavor of the food products as possible, the canned products are often packaged in a large amount of water. Both the water and the cans themselves often weigh as much or more than the actual food product itself. Thus, the water and the cans significantly add to the cost of transporting food products from one location to another. The weight also makes the cans relatively cumbersome to handle. Many consumers dislike canned fruits and vegetables for this reason. As such, alternative methods for processing and packaging fruits and vegetables are quickly embraced by many consumers.

In response to this demand for an alternative to canned fruits and vegetables, dehydrated products have made a relatively large inroad in the marketplace in recent years. Dehydrated products are gaining in popularity with producers because they are relatively simple to package. Dehydrated products may be packaged in sealed foil or plastic pouches. As such, the overall cost of the packaging is reduced. In addition, it should be recognized that plastic and foil packaging is less bulky than cans and, as such, inventory controls and storage space requirements are simplified and reduced.

From the consumer's point of view, the pouches are relatively easy to handle and store. The food products themselves are also easily utilized by simply rehydrating in water and then serving. In addition to this added convenience, many consumers find that the dehydrated products have a good flavor resembling that of fresh produce.

There are two primary approaches presently being followed to produce dehydrated food products. These are by freeze drying and air drying.

In freeze drying, a frozen food product is placed in a vacuum vessel, brought to a processing vacuum and then heated. Because of the vacuum, the water in the product sublimates, that is, changes phase directly from a frozen or solid state to a gaseous state.

Freeze dried products are of excellent overall quality. The products are not exposed to high temperatures during processing which might degrade quality. The internal cell structure of the products is also retained. As such, freeze dried products have an appearance and flavor more closely conforming to their fresh food counterparts. They also, advantageously, have a fast rehydration rate and, therefore, may be more quickly prepared by consumers. Food processors, therefore, find them to be superior quality ingredients for the formulation of convenience consumer products.

A significant drawback to freeze dried food products is, however, the processing costs. More specifically, freeze drying is an energy and capital intensive and slow process. Further, food products formulated with freeze-dried ingredients also become relatively expensive. For many foods, this additional cost drives the price of products formulated with the freeze dried food ingredients to a level unacceptable to consumers. As such, despite the improved appearance and added flavor, freeze dried dehydrated products have not always been successfully received in the marketplace.

In air drying, the food products may be dried at ambient temperature, but more typically are placed in dryers such as fluidized bed, continuous belt, or tray dryers in order to remove moisture with heated air. While the air drying procedure is relatively inexpensive when compared to freeze drying, it does suffer from a number of shortcomings. In particular, the resulting food products and particularly fruits and vegetables exhibit relatively low quality. For example, certain air dried products such as apples undergo a change in appearance during air drying, losing their color and to a certain extent, their texture. In some situations the flavor may also be affected. These factors make air dried food products less appealing to consumers who prefer an appearance and taste as closely as possible corresponding to that of the fresh produce.

Another problem with air dried products has to do with their rehydration rate. Air dried products take a relatively long period of time to rehydrate, that is for the dehydrated product to resaturate with water. Since it is often the desire of the food processor to provide a food product of the convenience variety which may be quickly prepared and served, this characteristic can be a significant drawback.

In order to address these problems with air dried products, a steam puffing process has been developed. After the product is initially air dried to 15 to 35 percent moisture wet basis, it is pressurized in a steam gun with super heated steam. Next, the product is puffed by quick release from the steam gun. It is then subsequently air dried to the desired moisture content.

This process does serve to increase the volume and internal porosity of the dehydrated product. As such, rehydration rates are advantageously increased. A problem arises, however, as the high temperature to which the product is subjected during its time in the steam gun can change product characteristics such as texture, nutrients, color and flavor. This, of course, reduces the appeal of the resulting product to the consuming public. Thus, a need is clearly identified for a new puffing process.

SUMMARY OF THE INVENTION

Accordingly, it is a primary object of the present invention to provide an improved method of processing food products overcoming the above-described limitations and disadvantages of the prior art.

Another object of the present invention is to provide an alternative to steam puffing of air dried, dehydrated food products.

Still another object of the present invention is to provide a process for puffing biological materials such as fruits and vegetables which are of superior quality when compared to simple, air dried products and far less expensive than freeze dried products.

Yet another object of the present invention is to provide a relatively simple procedure that allows relatively quick and efficient processing of dehydrated food products.

An additional object of the present invention is to provide an apparatus and method for puffing biological material that minimizes the use of puffing gas so as to reduce overall processing cost and also minimizes the loss of flavor and color in the material.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved method is provided for puffing biological material such as fruits, vegetables and other food products. Utilization of the present invention allows the processing of food products having a long shelf life while also maintaining both natural flavor and appearance.

The method of the present invention includes the step of placing the biological material in a pressure chamber. Next is the step of subjecting the biological material to a puffing gas at an increased pressure between substantially 400 and 1200 psi. The method proceeds by rapidly releasing the puffing gas pressure in order to puff the material. Finally, the process is completed by drying the biological material after puffing. This serves to set the biological material in the puffed state.

It is important that the biological material is properly prepared for puffing. This is done by sizing the biological material so as to include at least one dimension of between substantially 0.025 and 1.0 inches and preferably between substantially 0.062 and 0.375 inches. By sizing the material to include at least one dimension as described, the puffing gas can penetrate throughout the cell structure of the material in a more consistent concentration and in a relatively short period of time. Further, subsequent rehydration rates of the puffed material are increased as water also has less distance to penetrate in order to reach the center of each sized piece.

The preparation of the biological material for puffing also includes a step of reducing the moisture content of the biological material to between substantially 15 to 60% moisture content wet basis. The optimum moisture content depends to a large degree on the physical characteristics of the product. This can be done by drying the sized biological material on a fluidized bed, continuous belt, or tray dryer at, for example, 60° C. It is desired to maintain only sufficient moisture to provide a pliable biological material. If the material is too dry, its rigidity is increased until expansion is significantly prevented.

An alternative method of obtaining the proper moisture content is to rehydrate a dried product by placing in a humid environment such as air at 50° C. and 100% humidity for a sufficient period of time for the product moisture content to equilibrate at a level within the range of 15 to 60% wet basis.

Preferably, the method also includes the step of equilibrating the moisture content throughout each individual piece of biological material. This may be achieved in any number of ways such as by holding the biological material at the reduced moisture content level for a period of substantially 5–60 minutes. If further equilibration is desired, the biological material may be held in a refrigerated environment at 7° C. for, for example, 24 hours.

Preferably, the puffing gas utilized in the method of the present invention is carbon dioxide. Advantageously, carbon dioxide is relatively inert to the chemical compounds providing color, flavor and fragance to the foods being processed in accordance with the method of the present invention. Carbon dioxide also allows for the puffing of the biological material at processing temperatures that do not cause chemical degradation of the resulting product.

More particularly, during the puffing step, the biological material is maintained between a temperature of substantially −80° and 100° C. Still more preferably the biological material is maintained between a temperature of substantially −20° and 25° C. Frozen products can be puffed in accordance with the methods of the present invention since the frozen water is quickly melted by the heat of condensation of the carbon dioxide upon the ice crystals.

Under the most preferred processing conditions, the biological material is maintained between a temperature of substantially 4° and 10° C. during puffing. In no event, however, is the biological material ever allowed to reach a temperature sufficiently high to result in adverse chemical or enzymatic reactions that alter the overall quality of the product.

In accordance with further aspects of the present invention, the releasing of the puffing gas is to be completed in substantially three seconds or less and more preferably, in less than one second. By releasing the pressure quickly, the expansion forces created by the puffed gas within the biological material are maximized. This, advantageously, leads to a higher puffed volume of biological material.

Following puffing, it is important to dry the material in order to set the material in the puffed or expanded state.

In order to reduce the cost of processing as much as possible, it is desirable to control and limit the amount of carbon dioxide gas utilized during processing. This can be done in two ways. The first is to utilize a variable volume chamber for puffing. By reducing the volume of the chamber during pressurization with the puffing gas, the volume of the gas utilized is reduced. As the material is subsequently puffed by releasing the puffing gas pressure, the chamber is expanded, thereby increasing the volume so as to provide room for the biological material to expand.

The second method of reducing the utilization of carbon dioxide gas involves over pressuring the biological material and carbon dioxide puffing gas with an inert gas. Such an over pressuring gas must be completely unreactive with the puffing gas and the chemical compounds of the material being processed. By pumping inert over pressuring gas into the pressure chamber, the effective pressure of the puffing gas is increased to a desired level so as to fully penetrate deep into the biological material. Preferably, the inert over pressuring gas utilized is nitrogen or air. Nitrogen gas and air are readily available and relatively inexpensive. Thus, overall processing costs are reduced.

In accordance with yet another aspect of the present invention, an apparatus is provided for puffing biological material. The apparatus is equipped with a variable volume pressure chamber. The variable volume pressure chamber includes a cylinder. A cooperating piston is received in and engages the walls of the cylinder. In addition, an end cap is provided for closing the cylinder.

The apparatus also includes a means for driving the piston within a cylinder. By controlling the position of the piston within the cylinder, the volume of the chamber formed by the piston and cylinder may be varied. After the biological material to be processed is placed in the chamber, the volume of the chamber is reduced so as to be relatively small. The end cap is then sealed and the relatively small volume chamber is charged with a puffing gas. Of course, since the volume of the chamber is relatively small, the amount of puffing gas utilized is also relatively small.

After the puffing gas reaches the desired pressure and is maintained (or held) for the desired period of time so as to penetrate deeply into the biological material and reach chemical and physical equilibrium, the puffing gas is quickly released. As the puffing gas is released, the piston is displaced so that the volume of the chamber is increased. The increase in volume allows sufficient space for expansion of the biological material. As such, it should be appreciated that the apparatus of the present invention allows the economical processing of the biological material with a minimum of puffing gas.

The apparatus of the present invention also includes a treatment hopper for holding the biological material to be puffed. As the biological material is held in the hopper, it is flushed with puffing gas which serves to remove air by diffusion from the pores of the material. In addition, some of the flushing gas is absorbed and adsorbed by the material. The absorbed and adsorbed puffing gas presaturates the product with $CO_2$ and reduces the resident time required to reach equilibrium after pressurizing in the chamber. The apparatus also includes a means for directing the puffing gas released from the chamber during the puffing step into the treatment hopper for flushing the biological material held in the hopper. This recycling advantageously serves to further reduce and minimize the utilization of carbon dioxide and thus reduce the overall cost of processing.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
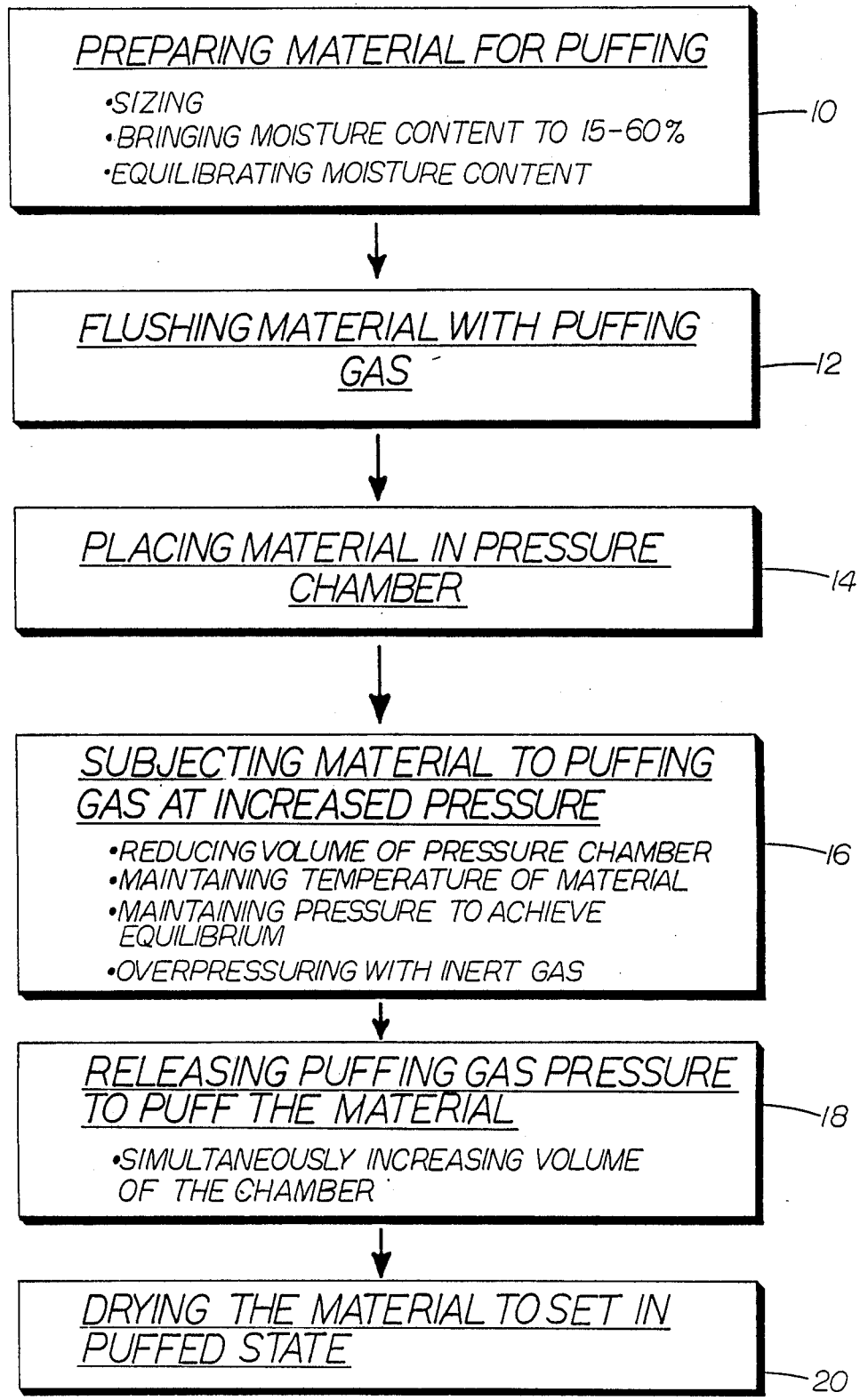
FIG. 1 is a schematic diagram of the steps of the method of the present invention for puffing biological material.

Reference is now made to FIG. 1 showing a schematic diagram of the method of the present invention for puffing biological material such as fruits, vegetables or other food products. For purposes of this detailed description, the method will be explained with reference to green bell peppers. Of course, it should be appreciated that the method is equally applicable to a number of other products such as mushrooms, carrots, celery, apples and meats.

The first step of the method of the present invention relates to the preparing of the material for puffing 10. This is done by sizing the bell peppers. The sizing may be completed by cutting, slicing or dicing the peppers so that they include at least one dimension of between substantially 0.025 and 1.0 inches. More preferably, for best results, the material is sized so as to include at least one dimension of between substantially 0.062 and 0.375 inches. By sizing the bell peppers in this manner, the distance to the center of each individual piece of sized bell pepper is sufficiently short to ensure saturation of each piece throughout with puffing gas within a reasonable time period.

After sizing is the step of reducing the moisture content of the bell peppers to between substantially 15 to 60% wet basis. More specifically, the sized bell peppers may be placed on a fluidized bed and subjected to air drying at, for example, 60° C. for a period of ten (10) minutes. The amount of moisture required for puffing depends to a large extent on the physical characteristics of the product. It should also be appreciated that it is desired to maintain at least sufficient moisture in the bell peppers to provide a pliable biological material. Overdrying is, however, to be avoided since this serves to increase the rigidity of the bell peppers to a point where subsequent expansion upon puffing is prevented.

In the alternative, a dried product may be rehydrated to a product moisture content within the range of 15 to 60% wet basis. This may be done by placing the product in a humid environment such as air at 50° C. and 100% humidity for a period of time to allow the product moisture content to equilibrate substantially throughout the product.

It is important to ensure that the moisture content is homogeneous throughout each individual piece of material. In order to achieve this result, it may be necessary to hold the bell peppers at the reduced moisture content level for a period of at least five to sixty minutes In the event further equilibration is desired as may be the case with a product such as apples, the material may even be held in a refrigerated environment at 7° C. for, for example, 24 hours. This will ensure a near homogeneous moisture content of each piece.

After fully preparing the material for puffing, it is placed in a container such as a treatment hopper. The peppers held in the hopper may be then subjected to flushing with the puffing gas 12. Advantageously, this flushing serves to remove air trapped in the pores of the bell peppers. In addition, some of the flushing gas becomes entrapped in the same pores while other puffing gas is actually absorbed by the water and adsorbed onto non-water solids in the material.

Following the flushing step is the step of placing the bell peppers in a pressure chamber 14. Next, the bell peppers are subjected to puffing gas at increased pressure 16. The preferred gas for puffing is carbon dioxide. Of course, it is desirable to minimize gas requirements as much as possible. In order to achieve this end, it is preferred that the volume of the pressure chamber be reduced prior to the subjecting of the bell peppers to the puffing gas.

System enthalpy determines the amount of pressurizing gas condensate present in the chamber. The enthalpy of the product placed in the pressure chamber in combination with the enthalpy of the pressurizing gas and any enthalpy transferred through the walls of the pressurized region will determine the system enthalpy. The system enthalpy is controlled by product temperature change, or a temperature control of the pressurizing gas entering the pressurized region during pressurization.

In order to provide the highest quality product, the green bell peppers should be maintained between a temperature of substantially −80° and 100° C. throughout processing. It is still more desirable to maintain the temperature between substantially −20° and 25° C. In order to achieve this end, the product may be in a deep frozen state when processing begins. This does not adversely affect processing since any frozen water still remaining in the product after preparation is quickly melted by the heat of condensation of the carbon dioxide upon the ice crystals.

Under the most preferred processing conditions, the green bell peppers are maintained between a temperature of substantially 4° and 10° C. during puffing. This temperature range provides the proper amount of system enthalpy and facilitates the storage of the product prior to puffing since these temperatures reduce microbial growth and enzymatic activity.

After maintaining the bell pepper pieces in contact with the carbon dioxide gas at increased pressure for a sufficient period of time, approximately ten minutes, to achieve a fairly homogeneous concentration of the gas throughout each piece (e.g. saturation and equilibration), the gas pressure is quickly released 18. The release of the gas pressure is completed within substantially three seconds and more preferably in less than one second. Best results for many products require the release of gas pressure in less than one tenth of a second (e.g. 0.09 seconds). Advantageously, by releasing the pressure quickly, the expansion forces created by the puffed gas adsorbed, absorbed and trapped within the pores of the biological material are maximized. As the trapped gas escapes from the bell pepper pieces, it serves to expand the individual cell structures, thereby leading to a higher puffed volume.

Following puffing, it is important to quickly dry the bell peppers in order to set them in the puffed or expanded state 20. This can be achieved by air drying the peppers to, for example, about 5% moisture content in a air dryer. Finally, if desired, the puffed product may be placed in a dessicator to remove residual moisture before storing.

The dried and puffed bell peppers may then be subjected to additional processing. This could include mixing the bell peppers with other dehydrated products which are then packaged for marketing to consumers. The consumers can rehydrate the products by simply adding water. After rehydration and heating if desired, the products are ready for consumption.

An apparatus for carrying out the method of the present invention is shown in FIGS. 2 A–E. As shown in the figures, the apparatus 30 includes a variable volume pressure chamber 32 including a cylinder housing 34. A cooperating piston 36 is received in sliding engagement with the cylinder or chamber C formed by the housing 34. As shown, the piston 36 includes dual sealing elements 37 about its periphery that serve to seal against the wall of the cylinder housing 34. The piston 36 is connected through a linkage 38 to a displacing or drive means 40, such as a hydraulic cylinder. The cylinder 40 serves to displace the piston 36 within the chamber C in a manner described in greater detail below.

Figure 2A:
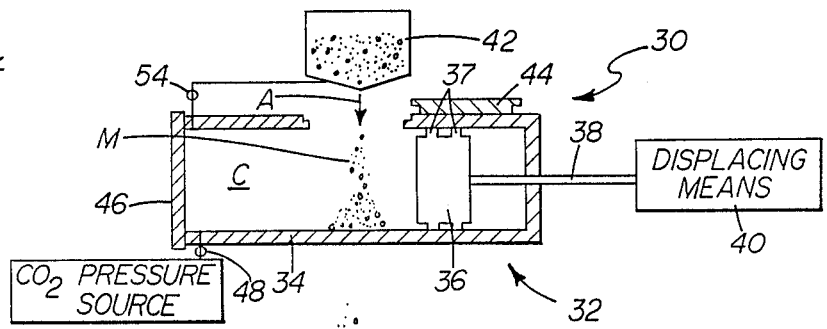
FIG. 2 is a schematic representation showing the apparatus of the present invention for utilization in puffing biological material.

As shown in FIG. 2A, the piston 36 is fully retracted within the cylinder 34. Biological material M to be puffed is then delivered (note action arrow A) from the treatment hopper 42 through the open charging door 44 into the chamber C.

Figure 2B:
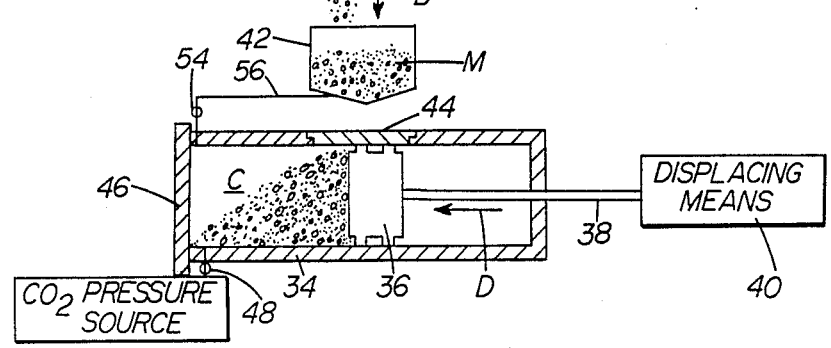
Figure 2C:
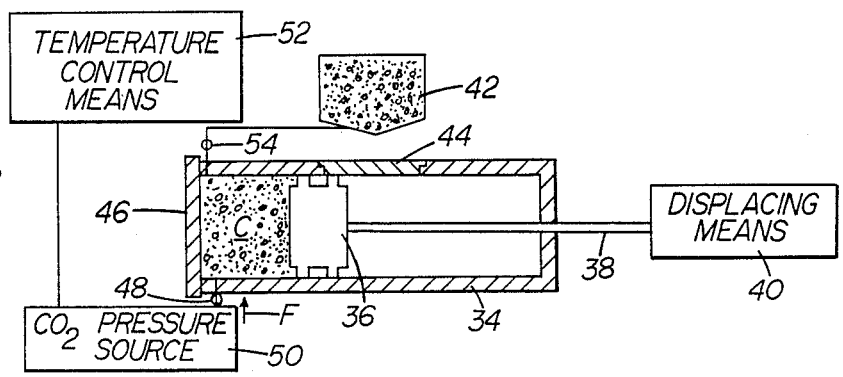

After fully charging the chamber C with biological material M, additional biological material is added to the treatment hopper 42 so that it is again filled (note action arrow B in FIG. 2B). The charging door 44 on the cylinder is also closed. Preferably, the door 44 is formed so that when it is closed, the inner surface of the door meets flush with the inner surface of the cylinder housing 44.

The three way valve 54 is opened to vent the chamber C to the atmosphere. The drive cylinder 40 is then actuated to extend the piston 36 so as to thereby reduce the volume of the pressure chamber C (note action arrow D). As the volume is reduced, air within the chamber C is expelled through the valve 54.

After the volume of the chamber C is sufficiently reduced, the valve 54 is closed and the valve 48 is then opened to connect the chamber C with a source of pressurized puffing gas 50. This causes the carbon dioxide puffing gas to flow in the direction of action arrow F into the chamber (see FIG. 2C). A temperature control means 52, such as a heat exchanger, may be connected to the pressure source 50 so as to control the temperature of the carbon dioxide puffing gas being delivered to the chamber C. This allows the enthalpy of the system to be controlled for the most efficient and effective puffing processing. The pressure of the puffing gas within the chamber C is increased to between substantially 400–1,200 psi. This pressure is maintained for a period of time, such as 30 seconds to fifteen minutes, to allow the absorption, adsorption, and pore saturation of the puffing gas at a relatively consistent level throughout the biological material M.

System enthalpy determines the amount of pressurizing gas condensate present in the chamber. The enthalpy of the product placed in the pressure chamber in combination with the enthalpy of the pressurizing gas and any enthalpy transferred through the walls of the pressurized region will determine the system enthalpy. The system enthalpy is controlled by product temperature change, or a temperature control of the pressurizing gas entering the pressurized region during pressurization.

Figure 2D:
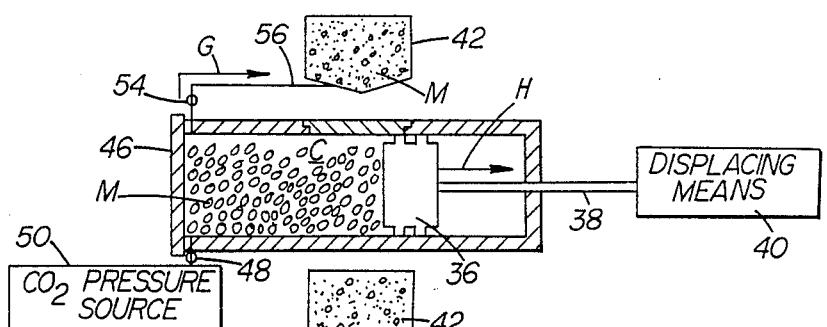

After pressurization and equilibration, the valve 48 leading to the source of pressurized puffing gas is closed and valve 54 is again opened (see FIG. 2D). When valve 54 is opened, the puffing gas is quickly released from the pressure chamber C. The gas is directed along a flow line 56 as shown by action arrow G toward the treatment hopper 42. There the carbon dioxide puffing gas may be delivered through a manifold or some other appropriate means (not shown) into the treatment hopper 42 where it or a fraction of it is utilized to flush the biological material M awaiting puffing.

Substantially simultaneously with the release of pressure, the drive cylinder 40 is activated to quickly retract the piston 36 (see action arrow H) and thereby increase the volume of the chamber C. The increased volume of the chamber serves to provide the necessary space for the biological material M within the chamber to expand as the quick release of carbon dioxide gas pressure causes puffing. Altogether, the release of the high pressure gas and the retracting of the piston 36 takes place within three and preferably less than one second. This quick operation is particularly important in subjecting the biological material M to the maximum expansion forces from puffing.

Figure 2E:
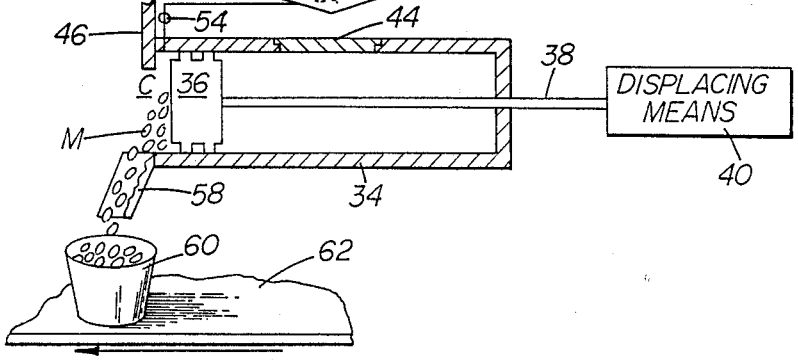

After puffing is completed, the end cap 46 is opened and the drive cylinder 40 activated to fully extend the piston 36. As shown in FIG. 2E, this causes the puffed biological material M to be expelled from the chamber C. As shown, the biological material may be delivered, for example, down a chute 58 into a container 60 on an underlying conveyor 62. The puffed biological material may then be delivered by the conveyor for further processing, such as drying, at another work station.

In summary, numerous benefits result from employing the concepts of the present invention. The present invention allows various food products to be puffed so as to improve rehydration rates without resorting to steam treatments and the associated high temperatures that tend to degrade the quality of the final product. Advantageously, both the apparatus and method described allow relatively quick and efficient processing of the food products while maintaining relatively high quality.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method of puffing cellular biological material in a pressure chamber, comprising the steps of:
   bringing the moisture content of the cellular biological material to between substantially 15 to 60% wet basis;
   placing the cellular biological material including at least one dimension of between substantially 0.025 and 1.0 inches in a pressure chamber;
   reducing the volume of the pressure chamber;
   subjecting the cellular biological material to a puffing gas at an increased pressure between substantially 400 and 1200 psi and at a temperature below a level sufficiently high to result in adverse chemical or enzymatic reactions that alter overall product quality;
   quickly releasing the puffing gas pressure to puff the cellular biological material;
   increasing the volume of said pressure chamber while substantially simultaneously releasing said puffing gas; and
   drying the cellular biological material after puffing to set the cellular biological material in the puffed state.

2. The method set forth in claim 1 including the step of:
   sizing the cellular biological material.

3. The method set forth in claim 2, wherein said sizing step include step of cutting said cellular biological material to at least one dimension of between substantially 0.062 and 0.375 inches.

4. The method set forth in claim 2, including the additional preparing step of holding the cellular biological material at a reduced moisture content level for a period of from substantially five to fifteen minutes to allow for partial equilibration of the material.

5. The method set forth in claim 1, including the additional step of controlling the temperature of the cellular biological material is that it remains between substantially −80° and 100° C. during puffing.

6. The method set forth in claim 1, including the additional step of adjusting the product temperature of the cellular biological material to be puffed between substantially −20° and 25° C. before puffing.

7. The method set forth in claim 1, including the additional step of controlling the temperature of the cellular biological material so that it remains between substantially 4° and 10° C. during puffing.

8. The method set forth in claim 1, including the step of maintaining said cellular biological material in contact with the puffing gas for a period of time at increased pressure to substantially achieve saturation and equilibration as well as uniform physical saturation of any liquid condensate present.

9. The method set forth in claim 1, wherein said puffing gas releasing step is completed in substantially 3 seconds or less.

10. The method set forth in claim 1, wherein said puffing gas releasing step is completed in less than 1 second.

11. Th emethod set forth in claim 1, wherein said gas is carbon dioxide and further including the step of controlling system enthalpy so that carbon dioxide gas is absorbed, adsorbed and condensed on said cellular biological material.

12. The method set forth in claim 1, including the additional step of flushing said cellular biological material with puffing gas prior to puffing so as to remove air from pores in said cellular biological material and also saturate water and non-water solids with puffing gas.

13. The method set forth in claim 1, wherein said puffing gas releasing step is completed in less than one tenth of a second.

14. The method set forth in claim 1, wherein said inert puffing gas is selected from a group consisting of air, nitrogen, carbon dioxide and any mixtures thereof.

* * * * *